United States Patent [19]
Kuehnast

[11] 3,772,594
[45] Nov. 13, 1973

[54] LIGHTNING FLASH-TO-BANG DETECTOR

[76] Inventor: Irving Kuehnast, 104 Surf Dr., Cocoa Beach, Fla. 32931

[22] Filed: Oct. 3, 1972

[21] Appl. No.: 294,754

Related U.S. Application Data
[63] Continuation-in-part of Ser. No. 33,322, April 30, 1970, abandoned.

[52] U.S. Cl. .................................. 324/72, 73/170 R
[51] Int. Cl. .............................................. G01w 1/00
[58] Field of Search ........................... 324/72, 189; 73/170 R

[56] References Cited
UNITED STATES PATENTS
3,715,660  2/1973  Ruhnke .................................. 324/72

FOREIGN PATENTS OR APPLICATIONS
1,448,585  3/1969  Germany ............................. 324/72

OTHER PUBLICATIONS
Howe et al., Proc. 6th Int. Symp. on Remote Sensing of Environment; Oct. 1969, pp. 1193–1203.

*Primary Examiner*—Alfred E. Smith
*Attorney*—Harry Herbert, Jr. et al.

[57] ABSTRACT

An apparatus for detecting cloud to ground lightning strokes and for determining the distance to the lightning stroke utilizing a sferics counter to count the number of sferics pulses for each lightning stroke. A time is utilized to measure the time differential between the lightning flash and the bang.

6 Claims, 2 Drawing Figures

LIGHTNING FLASH-TO-BANG DETECTOR

CROSS REFERENCE TO RELATED APPLICATION

The present patent application is a continuation-in-part of U.S. Pat. application Ser. No. 33,322 filed Apr. 30, 1970, and now abandoned entitled "Lightning Flash-to-bang Detector" by Irving L. Kuehnast.

BACKGROUND OF THE INVENTION

The present invention relates broadly to a lightning flash to bang detector and in particular to an apparatus for detecting cloud to ground lightning bursts and determining the distance to the lightning burst.

In the prior art various means and methods have been employed to sense the occurrence of thunderstorm activity within a radius of 50 miles and to predict a quantitative indication of the approach or intensification of the storm. When lightning occurs between cloud and ground, there is a transfer of charge which produces a change in the atmospheric electric field at great distances over the earth. The magnitude of the electrostatic field change for strokes to ground varies approximately with the inverse of the cube of the distance to the discharge. The luminosity of lightning varies during the discharge with pulsations of light often being observed in the same path. Associated with those pulses are surges of electric current in the channel. In atmospheric physics the components of the discharge that produce these are called "strokes."

As a storm approaches a weather observing station, the field changes associated with lightning increase so that when the distance to the strokes is one half its initial value the electric field changes are about eight times their original intensities. It has been noted that a cloud-to-ground lightning stroke at a distance of 64 kilometers (40 miles) produces a transient change in the atmospheric electric field of approximately 4 volts per meter. From Poisson's relation, this electric field change is equivalent to a change in the charge density at the surface of the earth of about 35 pico coulombs per square meter. The distance to the lightning strokes have not been accurate by the prior art devices.

A prior art device having a (lightning detector) operates by measuring the changes in the atmospheric electric field produced by lightning discharges. Each field change larger than about $2v\ m^{-1}$ is classified into one of four different categories according to its magnitude and used to activate one or more of four lightning indicating channels. The sensitivities of these indicating channels is controlled by variable attenuators which can be set so that the more insensitive channels progressively are activated by the larger field changes that occur as a thunderstorm approaches. In normal operation, the detector is often operated such that the first channel is actuated by electric field changes typical of could-to-ground discharges occurring within a radius of approximately 40 miles. The second channel is triggered similarly by lightning within about 20 miles, the third channel by lightning within about 10 miles, and the fourth channel by lightning closer still. The output signals from these channels are presented by indicator lights, on counters, and on the event marking pens of a recorder. By observing the progressive activation of successively more insensitive channels, an observer can extrapolate the trend and forecast the approach or intensification of a thunderstorm before it arrives over the station and before the electric field changes associated with the storm are a hazard to local operations.

There is an appreciable possibility of a lightning discharge whenever convective clouds are in the vicinity and a buildup of a high electric field is detected. Developing thunderstorms usually create high electric fields in the air beneath them before they produce the first lightning discharge. Whenever a high electric field is present and there are no convective clouds nearby, the possibility of lightning discharges is low. Therefore, it may be seen that the operator of this equipment is required to possess a certain degree of experience and familiarity with the equipment operation and indications, since a detector in proper adjustment will respond to all lightning discharges in the vicinity. These prior art devices cannot differentiate between nor separate the discharges that strike the installation to be warned from those discharges which strike in the immediate vicinity. The present invention has the capability to differentiate between cloud-to-cloud lightning and cloud-to-ground strokes. It provides automatic operation and is compatible with any type of readout, either direct or indirect. The present apparatus solves the problem of determining the distance to a cloud-to-ground lightning stroke.

SUMMARY OF THE INVENTION

The present invention utilizes a sferics counter receiver and an audio receiver in conjunction with a timer to determine the distance from a cloud-to-ground lightning stroke and to provide a warning for critical operations, such as, a missile launch, refueling. The sferics counter receiver provides the capability to count the number (rate) of sferics pulses for each lightning burst (stroke). The sferics pulse rate of a cloud-to-ground burst is normally greater than a cloud-to-cloud burst by an order of several magnitudes. Thus, the present invention has the capability to differentiate cloud-to-ground strokes. The timer is activated when a lightning stroke is received at the sferics counter receiver and is deactivated when the sonic boom is received by the audio receiver. The distance to the lightning stroke is directly proportional to the time interval shown on the timer.

It is one object of the invention, therefore, to provide an improved lightning flash to bang detector apparatus having the capability to differentiate between cloud-to-cloud lightning and cloud-to-ground strokes.

It is another object of the invention to provide a lightning detector apparatus to detect cloud-to-ground lightning strokes and to determine the distance to the lightning burst.

It is yet another object of the invention to provide a lightning detector apparatus having an automatic computation for the distance a lightning stroke is from the apparatus antenna.

It is still another object of the invention to provide a measurement of the lightning intensity in volts per meter.

These and other advantages, objects and features of the invention will become more apparent from the following detailed description when taken in conjunction with the illustrative embodiments in the accompanying drawings.

DESCRIPTION OF THE PREFERRED EMBODIMENT

Figure 1:
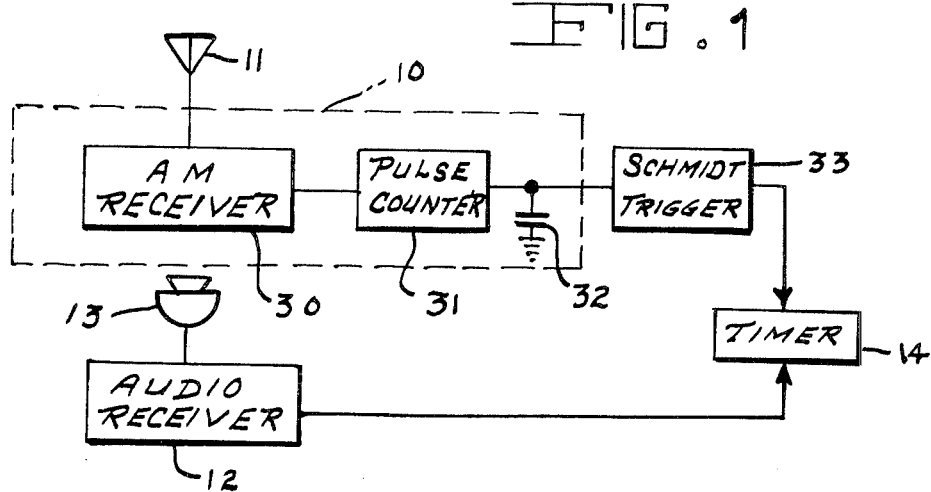
FIG. 1 is a blcok diagram of the lightning flash-to-bang detector apparatus in accordance with this invention.

Referring now to FIG. 1, there is shown a lightning flash-to-bang detector apparatus utilizing a timer unit 14 to measure the distance to the lightning stroke (burst). When a lightning electromagnetic signal is received by antenna 11, it is fed to sferics counter receiver 10. The sferics counter receiver 10 may be adjusted to respond only to lightning strokes which are indicative of cloud-to-ground bursts. The sferics pulse rate of a cloud-to-ground burst is normally greater by several magnitudes of order than the sferics rate of a cloud-to-cloud burst. Thus, the sferics counter receiver 10 is able to differentiate cloud-to-ground strokes. Therefore, the sferics counter receiver 10 determines the rate of sferic pulses for each lightning burst that is received and when the rate exceeds a predetermined count rate, a timer unit 14 is activated.

The sferics counter receiver 10 comprises an AM receiver 30, a pulse counter 31 and a storage capacitor 32. The AM receiver 30 may be any conventional AM receiver which is capable of receiving 400 to 500 kc. The AM receiver is utilized to detect the RF transmission which is emitted by a lightning stroke. Since a lightning stroke is essentially a series of steps which are referred to as step leaders, the RF signal from the stroke results in a pulsating signal. The AM receiver 30 utilizes signal level input control to separate lightning RF signals from sferics RF signals. The signal level input control allows only the higher gain lightning signal to pass through the 500 kc receiver, and filter out low gain signals such as distant lightning and spurious low gain sferics. Cloud to ground lightning detection is accomplished by counting the rate of sferics pulses associated with each lightning burst. The electrical current flow of a cloud to ground burst is several magnitudes greater than cloud to cloud bursts. By the same token, the sferics count rate of a cloud to ground burst is several magnitudes greater than a cloud to cloud burst. The pulsating signal which is received by the receiver 30 is fed into the pulse counter 31 which counts the total number of pulses per lightning burst. The pulse counter 31 is utilized to produce a uniform pulse, both in amplitude and length, which are representative of the received sferics pulses. A storage capacitor 32 is charged by the output pulse of the pulse counter 31. The total charge on capacitor 32 represents the total number of sferics pulses or counts per ligtning stroke. The greater number of pulses the higher the charge on the capacitor 32. Whenever the charge reaches the threshold of a cloud to ground burst, the schmidt trigger 33 is triggered to activate the timer 14. The sferic counter receiver 10 is a conventional commercially available unit, such as the Total Sferics Monitor, Model C (TSM/C) which is manufactured by the Litton Industries, Minneapolis, Minn. However, the TSM/C unit is modified to the extent that the storage capacitor 32 is chosen so as to have a shorter discharge time constant, 2–3 seconds as compared with 15–20 seconds for the capacitor which is supplied with the unit. The schmidt Trigger 33 is also a conventional trigger circuit which may be found in any electronics reference book. Once the timer 14 is activated the distance to the lightning stroke is being measured and recorded. The clap of thunder or bang which is normally associated with a lightning stroke is received by audio microphone 13. The audio signal triggers the audio receiver 12 to send a control signal to timer 14 which deactivates the timer unit 14. The time recorded on the timer 14 represents the distance of the lightning burst to the antenna. The faceplate of the timer unit 14 may be sealed to read directly in feet or in miles because the distance may be determined according to the formula:

$$d = Vt$$

where $d$ is the distance to the lightning burst,
$V$ is the velocity of sound, and
$t$ is the measured time interval.

Figure 2:
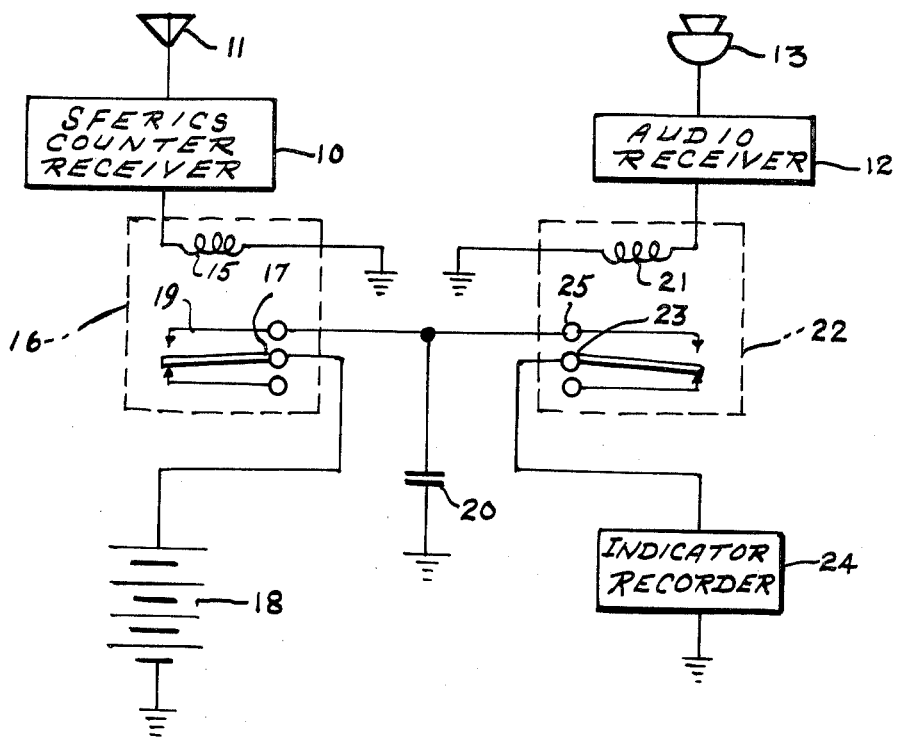
FIG. 2 is a schematic diagram of the lightning detector apparatus utilizing a capacitor circuit to measure time differentials.

In FIG. 2 there is shown a schematic diagram of the lightning detector apparatus utilizing a capacitor circuit in conjunction with an indicator/recorder device to measure time differentials to the lightning burst. The sferics counter 10 and the audio receiver 12 are identical to the device used in FIG. 1 and operate in substantially the same manner in the present circuit arrangement. Sferics counter receiver 10 responds to a lightning electromagnetic signal which is received at antenna 11 by energizing relay coil 15 of relay unit 16. Relay unit 16 contains a single set of contacts which are in the normally open position. Movable contact 17 is connected to a voltage source 18 which has a preselected DC voltage level. Fixed contact 19 is connected to timing capacitor 20. Audio receiver 12 is connected to relay coil 21 of relay unit 22. Relay coil 21 will be energized by audio receiver 12 when a lightning bang is received by audio microphone 13. Relay unit 22 contains a single set of relay contacts in which the movable contact 23 is connected to indicator/recorder unit 24. The fixed contact 25 is directly connected to both fixed contact 19 and timing capacitor 20. When a lightning burst occurs, electromagnetic lightning signals are received by antenna 11 and are fed to the sferics counter receiver 10. If the sferics pulse rate reaches or exceeds a predetermined level, the received signal is identified as a cloud-to-ground burst. The sferics counter receiver then energizes relay coil 15 which closes movable contact 19 to fixed contact 19. The relay unit 16 is energized for only a short period of time but is sufficiently long enough to charge timing capacitor 20 to the full voltage that exists across voltage source 18. Timing capacitor 20 is a slow discharge capacitor which requires approximately 60 seconds for the full voltage charge to bleed off.

The thunder clap which is associated with a lightning stroke travels at the speed of sound and arrives at audio microphone after the time interval required to traverse the distance from the lightning stroke to the microphone 13. Audio receiver 12 energizes relay coil 21 and thus closes movable contact 23 with fixed contact 25 for a predetermined length of time. This circuit connects the indicator/recorder unit 25 to timing capacitor 20. The indicator/recorder unit 24 then measures the amount of voltage on the timing capacitor 20. The voltage remaining on the slow discharge capacitor 20 represents the amount of time from full charge (cloud to ground burst was first detected) to when audible thunder was detected. This time interval represents the distance of the lightning stroke from the antenna which by using the speed of sound conversion formula is converted into a distance value from the antenna to the lightning stroke.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. A lightning detector apparatus for detecting cloud-to-ground lightning strokes and for determining the distance to the lightning stroke comprising in combination:

an antenna responsive to lightning electromagnetic signals from a lightning stroke, a sferics counter receiver connected to said antenna, said sferics counter receiver determining the sferics pluse rate of said lightning electromagnetic signals, said sferic counter receiver providing an output signal when said sferics pulse rate exceeds a predetermined count rate, a schmidt trigger circuit connected to said sferics counter receiver to receive said output signal, said schmidt trigger circuit providing an output trigger signal, in response to said output signal, an audio microphone responsive to the thunder clap of said lightning stroke, an audio receiver connected to said audio microphone, said audio receiver receiving said thunder clap and providing a deactivating signal corresponding thereto, a timer unit connected to both said schmidt trigger circuit and said audio receiver, said timer unit being activated by said output trigger signal from said schmidt trigger circuit, said timer unit being deactivated by said deactivating signal, said timer unit having recorded the time interval between said lightning stroke and said thunder clap.

2. A lightning detector apparatus as described in claim 1 wherein said sferics counter receiver comprises:

an AM receiver capable of receiving 400–500 kc, said AM receiver providing a sferics output signal, a pulse counter connected to said AM receiver to receive said sferics output signal, said pulse counter providing uniform output pulses in response to said sferics output signal, and a storage capacitor receiving said sferics output signal, said storage capacitor being charged in proportion to said sferics pulse rate, said storage capacitor providing an output signal.

3. A lightning detector apparatus as described in claim 1 wherein said time interval represents the distance in time from said antenna to said lightning stroke.

4. A lightning detector apparatus as described in claim 1 wherein said timer unit comprises:

a first relay unit having a set of normally open relay contacts, said relay contacts having a fixed and a movable contact, said first relay unit being momentarily energized by said sferics counter receiver, a second relay unit having a set of normally open relay contacts, said second relay unit having a fixed and a movable contact, said second relay unit being energized by said audio receiver for a predetermined length of time, a voltage source having a preselected DC voltage level, said voltage source being connected to said movable contact of said first relay unit, a capacitor having one end connected between said fixed contact of said first relay unit and said fixed contact of said second relay unit, the other end of said capacitor being connected to ground, said capacitor being charged to the full voltage charge of said voltage source when said first relay unit is energized; and an indicator/recorder unit connected to said movable contact of said second relay unit to record the voltage level remaining on said capacitor.

5. A lightning detector apparatus as described in claim 3 wherein said capacitor is a slow discharge capacitor requiring approximately 60 seconds to discharge completely.

6. A lightning detector apparatus as described in claim 3 wherein said voltage level remaining on said capacitor represents the time interval from full voltage charge to the audible thunder clap.

* * * * *